July 30, 1968     R. E. HARDER     3,394,924
INTERFACIAL SURFACE GENERATOR
Filed July 18, 1966
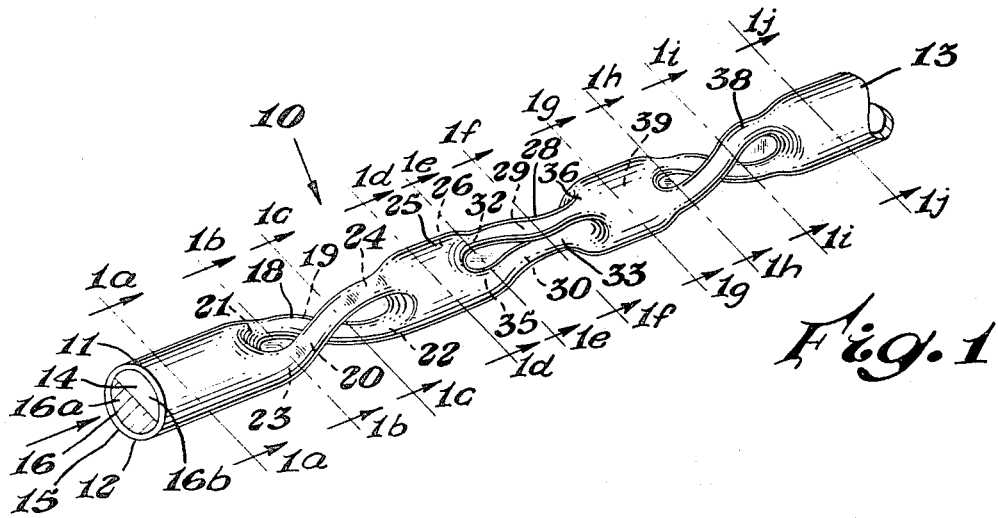
Fig. 1
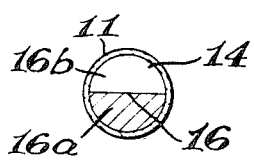
Fig. 1a
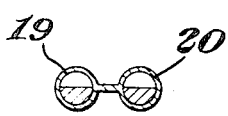
Fig. 1b
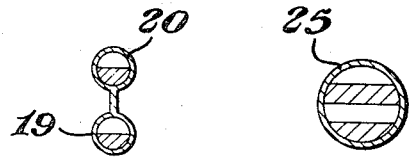
Fig. 1c    Fig. 1d
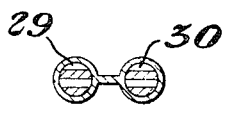
Fig. 1e
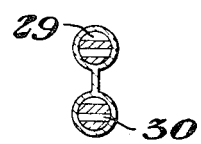
Fig. 1f
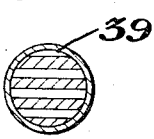
Fig. 1g
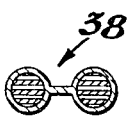
Fig. 1h
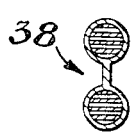
Fig. 1i
Fig. 1j
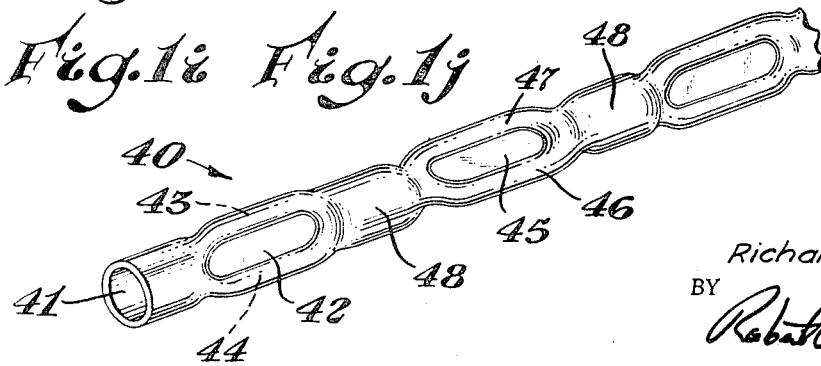
Fig. 2
INVENTOR.
Richard E. Harder
BY
AGENT

United States Patent Office 3,394,924
Patented July 30, 1968

3,394,924
INTERFACIAL SURFACE GENERATOR
Richard E. Harder, Williamsburg, Va., assignor to The Dow Chemical Company, Midland, Mich., a corporation of Delaware
Filed July 18, 1966, Ser. No. 565,889
6 Claims. (Cl. 259—4)

ABSTRACT OF THE DISCLOSURE

A mixer is prepared by crimping and twisting of a deformable tube. The mixing action is obtained by a division of the stream, lateral expansion, recombination and subsequent repetition of the foregoing steps until the desired degree of mixing is obtained. Below turbulence mixing is generally independent of the throughput.

---

This invention relates to an interfacial surface generator, and more particularly relates to a readily prepared interfacial surface generator which may be constructed from a deformable tube.

The term "interfacial surface generator" is employed herein to describe a static mixing element through which a stream of liquid, gas or particulate solids may be passed and the configuration of the generator is such that the stream is divided and recombined to provide mixing. Several varieties of such mixers are known and disclosed in U.S. Letters Patent 3,051,452, 3,051,453, 3,182,965 and 3,195,865. Such interfacial surface generators are generally obtained by providing a baffle or stream deflecting element of a specific configuration within a conduit or passageway. Frequently, such interfacial surface generators require machining of blocks, molding, casting, or sheet fabrication to obtain baffles of the desired configuration.

It would be desirable if there were available an interfacial surface generator prepared from a single deformable conduit.

A method for the preparation of such an interfacial surface generator comprises deforming opposed wall portions of a deformable conduit to form a first constriction; the wall of the conduit being deformed to provide first and second creases; the first and second creases being in generally contacting relationship, thereby causing the passageway within the conduit to become bifurcated; the first constriction of the conduit forming two generally parallel passageways; forming a second constriction within the conduit of generally similar configuration to the first constriction and separated therefrom, thereby leaving a generally undeformed portion of the conduit between the first and second constrictions; the bifurcated passageways of the first constriction and the second constriction lying in planes which are angularly disposed from each other, forming a third constriction of the conduit generally similar to the first and second constrictions; the plane of the bifurcated passageways of the third constriction being generally parallel to the plane of the passages of the first constriction; deforming the first and second constriction of the conduit by rotating the conduit about its axis, in a region lying between the first and third constrictions; deforming the conduit to provide a fourth constriction generally similar to the first deformed section and having a bifurcated passageway lying in a plane generally parallel to a plane containing the passageways of the second constriction; deforming the constriction by rotating a portion of the conduit lying between the second and fourth constriction through an angular displacement similar to the angular displacement of the portion of the conduit lying between the first and third constriction of the conduit.

The present invention is an interfacial surface generator comprising a conduit; the conduit defining a passageway therein; the conduit having wall portions and a longitudinal axis; the conduit having a first deformed section wherein opposed wall portions approach each other thereby dividing the passageway into at least a first deformed passage and a second deformed passage; each deformed passage having a first end and a second end in full communication with the passageway defined within the conduit; the first ends of the first and second deformed passages being disposed generally adjacent, the second ends of the first and second passages being disposed generally adjacent; a line joining the geometric centers of a cross-sectional configuration of the first ends in a plane generally normal to the axis of the conduit being disposed in angular relationship to a line joining the geometric centers of the cross-sectional configuration of the second ends; a second deformed section in the conduit generally adjacent the second ends of the passages of the first deformed section; the second deformed section having a configuration generally similar to the first deformed section; a line joining the geometric centers of the cross-sectional configuration of the first ends of the passageways of the second deformed section and the line joining the geometric centers of a cross-sectional configuration of the second ends of the first deformed section being disposed in angular relationship; the angular displacement of the lines joining the geometric centers of the cross-sectional configurations of the first ends of the passageway of the second deformation and the line joining the geometric centers of the cross-sectional configurations of the second end of the passageways of the second deformation in a plane normal to the longitudinal axis being generally equal to the displacement between a line joining the geometric centers of the cross-sectional configurations of the first ends and a line joining geometric centers of the cross-sectional configurations of the second ends of the passages of the first deformed section.

Further features and advantages of the present invention will become more apparent from the following specification when taken in connection with the drawing wherein:

FIGURE 1 is a schematic representation of an interfacial surface generator in accordance with the present invention wherein a cross-sectional configuration and flow pattern at various stages is depicted in FIGURES 1a–1j.

FIGURE 2 schematically illustrates a method of formation of interfacial surface generators.

In FIGURE 1 there is depicted an interfacial surface generator generally designated by the reference numeral 10. The interfacial surface generator 10 comprises a hollow conduit 11 having a first or entrance end 12 and a second or discharge end 13. The conduit 11 defines an internal passageway 14. A stream 16 of a fluid material is depicted in the passageway 14. The stream 16 comprises a first component 16a and a second component 16b. The conduit 11 has a wall 15. The conduit 11 has a first deformation 18 of the wall 15. The wall 15 of the conduit 11 in the region of the deformation 18 is pinched together to define a first deformed passageway 19 and a second first deformed passageway 20. The passageway 19 has a first end 21 and a second end 22. The passageway 20 has a first or upstream end 23 and a second or downstream end 24. The passageways 19 and 20 are in full communication with the passageway 14. A line joining the geometric centers of the cross-sectional configuration of the first ends 21 and 23 is disposed in angular relationship to a line joining the geometric centers of the second ends 22 and 24. Generally adjacent the second ends 22 and 24 of the passageways 19 and 20 is a portion 25 of the conduit 11 which defines therein a single passageway 26. Adjacent the passageway 26 and remote from the second end of the first deformation is a second deformation 28. The second deformation 28 defines a first passageway 29 and a second passageway 30. The first passageway 29 of the second deformation 28 has a first end 32 and a second end 36. The second passageway 30 has a first end 35 and a second end 33. A line drawn between the geometric centers of the first ends 32 and 35 is disposed in angular relationship to a similar line joining the geometric centers of the second ends 22 and 24 of the passages 19 and 20 of the first deformation 18. A line joining the geometric centers of the cross-sectional configuration of the second ends 33 and 36 is in angular relationship with respect to the line joining the geometric centers of the cross-sectional configuration of the first ends 32 and 35 of the passages 29 and 30. A third deformation 38 is disposed adjacent the second deformation 28. A single passageway 39 is defined by the conduit 11 between the deformations 28 and 38. The deformation 38 has a configuration and orientation relative to the axis of the conduit substantially similar to the first deformation. Simplified flow patterns of the stream 16 are shown in the cross-sections designated FIGURES 1a, 1b, 1c, 1d, 1e, 1f, 1g, 1h, 1i, 1j taken along the line 1a—1a, 1b—1b, 1c—1c, 1d—1d, 1e—1e, 1f—1f, 1g—1g, 1h—1h, 1i—1i and 1j—1j, respectively, wherein the general layering effect and division are shown having a two component stream such as the stream 16 composed of the components 16a and 16b.

The embodiment depicted in FIGURE 1 operates employing a flow pattern substantially as depicted in U.S. Patents 3,051,453 and 3,195,865.

In FIGURE 2 there is schematically depicted a conduit 40. The conduit 40 has a passage 41 defined therein. A first deformation or crimp 42 is formed in the conduit 40. The crimp or crease serves to bifurcate the passage 41 and provide a first passage 43 and a second passage 44. Adjacent to the first crimp or deformation 42 is a second crimp or deformation 45 wherein the conduit again bifurcates the passage 41 to form a first passage 46 and a second passage 47. A relatively undeformed portion 48 is disposed between the deformations 42 and 45. Rotation of the portion 48 about the axis of the conduit to provide relatively smooth twisting of the conduit results in the configuration depicted in FIGURE 1. Thus, in the preparation of an interfacial surface generator in accordance with the present invention, a plurality of deformations are pressed in a tube in such a manner that alternate crimps are parallel and adjacent crimps are disposed at about 90°, the angular measurements being rotational measurements about the axis of the conduit. The interfacial surface generator is then formed by rotating the portion of the conduit lying between adjacent ends of adjacent crimps by about 90° while restraining the remote ends of the adjacent crimps from rotation.

Interfacial surface generators in accordance with the present invention are readily prepared from a wide variety of materials. Beneficially, the most advantageous materials are those which are capable of undergoing plastic deformation such as ductile metals, glass, synthetic resinous thermoplastic resins and the like. For example, a glass tube may readily be heated and crimped in the manner depicted in FIGURE 2 to provide a plurality of deformations, each deformation dividing the tube into at least two generally parallel passageways. By restraining the conduit at the extreme ends of adjacent deformations, heating of the deformations to a degree sufficient to permit plastic flow of the glass, and rotation of the conduit portion lying between the deformation, the configuration depicted in FIGURE 1 results. If the portions of the conduit lying between the deformations were considered in sequence and numbered 1, 2, 3, 4, 5, etc., by restraining the end portion and portion 2, rotating portion 1, restraining portions 2 and 4 and rotating portion 3, restraining portions 4 and 6, rotating portion 5, interfacial surface generators can be prepared having almost any desired number of stages by repeating the crimp and twist sequence. It is not necessary that the portions which are rotated be rotated in the same direction. Often, it may be beneficial in order to achieve symmetrical flow and minimal rotation of the stream that alternate twists may be made in opposite directions. Employing a tubular configuration, minor rotation of the streams may occur, but this rotation is always substantially less than the rotation of the bifurcated passageway and sufficient displacement occurs to provide adequate mixing.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. An interfacial surface generator comprising a conduit, the conduit defining a passageway therein, the conduit having wall portions and a longitudinal axis, the conduit having a first deformed section wherein opposed wall portions approach each other thereby dividing the passageway into a first deformed passage and a second deformed passage, each deformed passage having a first end and a second end in full communication with the passageway defined within the conduit, the first ends of the first and second deformed passages being disposed generally adjacent, the second ends of the first and second passages being disposed generally adjacent, a line joining the geometric centers of a cross-sectional configuration of the first ends in a plane generally normal to the axis of the conduit being disposed in angular relationship to a line joining the geometric centers of the cross-sectional configuration of the second ends, a second deformed section in the conduit generally adjacent the second ends of the passages of the first deformed section, the second deformed section having a configuration generally similar to the first deformed section, a line joining the geometric centers of the cross-sectional configuration of the first ends of the passageways of the second deformed section and the line joining the geometric centers of a cross-sectional configuration of the second ends of the first deformed section being disposed in angular relationship, and the angular displacement of the lines joining the geometric centers of the cross-sectional configurations of the first ends of the passageway of the second deformation and the line joining the geometric centers of the cross-sectional configurations of the second end of the passageways of the second deformation in a plane normal to the longitudinal axis being generally equal to the displacement between a line joining the geometric centers of the cross-sectional configuration of the first ends and a line joining the geometric centers of the cross-sectional configurations of the second ends of the passage of the first deformed section.

2. The interfacial surface generator of claim 1 wherein the conduit is a metal conduit.

3. The conduit of claim 1 wherein the conduit is a glass conduit.

4. The interfacial surface generator of claim 1 wherein each of the deformed sections defines elongated passages.

5. The conduit of claim 1 wherein opposed portions of the conduit wall are in contact with each other in the deformed sections.

6. The conduit of claim 5 wherein the opposed wall portions are joined to each other in the region defining passages.

References Cited

UNITED STATES PATENTS

| | | | |
|---|---|---|---|
| 3,051,452 | 8/1962 | Nobel | 259—4 |
| 3,051,453 | 8/1962 | Sluijters | 259—4 |

WALTER A. SCHEEL, *Primary Examiner.*

J. M. BELL, *Assistant Examiner.*